(12) United States Patent
Gandhi et al.

(10) Patent No.: US 10,424,012 B2
(45) Date of Patent: Sep. 24, 2019

(54) COMPUTING DEVICE AND METHOD FOR THE TEMPORAL ARRANGEMENT OF DATA

(71) Applicant: The Toronto-Dominion Bank, Toronto (CA)

(72) Inventors: Rajeev Kumar Gandhi, Toronto (CA); Robert Kyle Miller, Toronto (CA); Paul Mon-Wah Chan, Toronto (CA); John Jong Suk Lee, Toronto (CA); Rakesh Thomas Jethwa, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 364 days.

(21) Appl. No.: 15/290,556

(22) Filed: Oct. 11, 2016

(65) Prior Publication Data

US 2018/0101903 A1 Apr. 12, 2018

(51) Int. Cl.

| | | |
|---|---|---|
| *G06F 17/00* | (2019.01) | |
| *G06Q 40/02* | (2012.01) | |
| *G06Q 10/10* | (2012.01) | |
| *G06F 3/0484* | (2013.01) | |
| *G06F 8/34* | (2018.01) | |
| *G06F 3/0481* | (2013.01) | |
| *G06F 3/0486* | (2013.01) | |

(52) U.S. Cl.
CPC ......... *G06Q 40/02* (2013.01); *G06F 3/04815* (2013.01); *G06F 3/04847* (2013.01); *G06F 8/34* (2013.01); *G06Q 10/1097* (2013.01); *G06F 3/0486* (2013.01)

(58) Field of Classification Search
None
See application file for complete search history.

(56) References Cited

U.S. PATENT DOCUMENTS

| | | | | |
|---|---|---|---|---|
| 8,380,591 | B1 * | 2/2013 | Kazenas | G06Q 20/145 705/30 |
| 8,380,623 | B1 * | 2/2013 | Ley | G06Q 40/02 705/35 |
| 2009/0204538 | A1 * | 8/2009 | Ley | G06F 3/04847 705/40 |
| 2010/0161467 | A1 * | 6/2010 | Ageenko | G06Q 40/00 705/35 |
| 2011/0225015 | A1 * | 9/2011 | Spivack | G06Q 10/06314 705/7.24 |
| 2013/0041816 | A1 * | 2/2013 | DiGiulio | G06Q 40/02 705/40 |
| 2013/0268369 | A1 * | 10/2013 | McMaster | G06Q 30/01 705/14.66 |
| 2013/0335419 | A1 * | 12/2013 | Bondesen | G06T 11/206 345/440 |
| 2015/0019642 | A1 * | 1/2015 | Wang | H04L 67/306 709/204 |

(Continued)

*Primary Examiner* — Mustafa A Amin
(74) *Attorney, Agent, or Firm* — Duane Morris LLP

(57) ABSTRACT

A computing device and method for managing an account. A computer displays a historical timeline and an event placement timeline. Past events are shown along the historical timeline, and future events along the event placement timeline. The computer suggest a change to the timing of one of the events. The user moves a movable object to the proposed timing to reschedule the event. The settings of the account are modified to automatically execute that event at the new timing.

20 Claims, 8 Drawing Sheets

(56) References Cited

U.S. PATENT DOCUMENTS

| | | | |
|---|---|---|---|
| 2015/0058873 A1* | 2/2015 | Newell | H04N 21/47214 |
| | | | 725/14 |
| 2015/0324453 A1* | 11/2015 | Werner | G06F 17/30601 |
| | | | 707/738 |
| 2016/0012512 A1* | 1/2016 | Haiby | G06Q 30/0631 |
| | | | 705/26.7 |
| 2016/0104237 A1* | 4/2016 | Kanjlia | G06Q 40/02 |
| | | | 705/35 |
| 2017/0061393 A1* | 3/2017 | Park, II | G06Q 10/10 |
| 2018/0268487 A1* | 9/2018 | Matthews | G06Q 20/10 |

* cited by examiner

COMPUTING DEVICE AND METHOD FOR THE TEMPORAL ARRANGEMENT OF DATA

TECHNICAL FIELD OF THE INVENTION

This invention relates to the field of computer-implemented data management.

BACKGROUND OF THE INVENTION

Computer systems, and associated methods, for data management are in wide use. Such systems and methods vary widely in configuration. In addition, there are many different types of data management to which such systems and methods are applied.

One common example of data is financial data. There is a need for computer-implemented devices and methods that help account holders with cash flow management.

SUMMARY OF THE INVENTION

This patent application discloses a computing device and method for temporal arrangement of data. In one embodiment the data is financial data, and a computing device and method for managing an account are disclosed.

In accordance with a first aspect of the invention, the computer receives data of at least one account event associated with an account. An account event timeline image for showing the timing of the at least one account account event is displayed on a display. An event placement timeline image for scheduling of account events is also displayed on the display. At least one account event image, each corresponding to an account event, is positioned along the account event timeline image.

One of the account events is identified for scheduling. The computer determines a proposed timing at which the identified account event is to be scheduled (i.e. at which the identified account event will take place), and displays a proposed timing image visually associated with the point on the event placement timeline corresponding to the proposed timing. A movable object is also displayed.

When input is received in relation to the movable object (for example, it is dragged and dropped to the position on the event placement timeline image corresponding to the proposed timing), the identified account event is scheduled for automatic execution at the proposed timing.

In accordance with another aspect of the invention, the computer receives data of at least one event associated with an account. An event placement timeline image, representing a future time period, is displayed on a display. Also displayed is at least one event image, each corresponding to a future event, positioned along the event placement timeline image for showing the timing of each future event.

The computer determines a preferred event time range during which the likelihood of a predefined adverse outcome resulting from one of the future events is reduced. A predefined adverse outcome might be, for example, an insufficient funds event or an overdraft event.

The computer displays on the display a preferred event time range indicator—such as, for example, a highlighted region—along the timeline image. The size of the indicator corresponds to the size of the preferred event time range. The computer identifies one of the future events for movement into the preferred event time range to reduce the likelihood of a predefined adverse outcome.

The computer displays a movable object. When input is received in relation to the movable object—for example, by the object being dragged and dropped at a point on the timeline within the preferred event time range—settings are modified to automatically execute the identified future event at a time within the preferred event time range.

BRIEF DESCRIPTION OF THE DRAWINGS

Reference will now be made, by way of example only, to figures which illustrate embodiments of the invention, and in which.

DETAILED DESCRIPTION OF THE PREFERRED EMBODIMENTS

Figure 1:
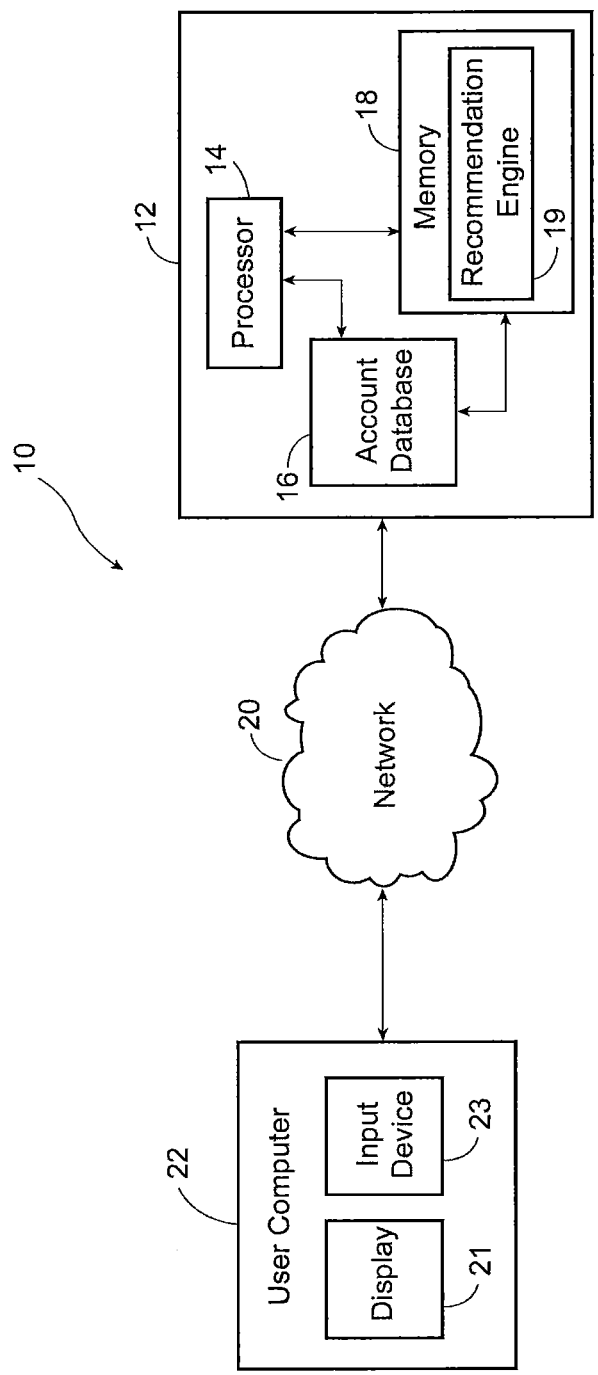
FIG. 1 is a schematic diagram of the computing device.

One type of computer-implemented data management system is a financial management computer system that can be used by customers of banks to access and manage bank accounts, or other similar accounts. In a typical scenario, the customer has an account at a bank, and the bank provides a computer-implemented system for facilitating the customer's management of his account. That system permits connection by the customer through a network, usually the internet. The customer may be able to access the system via a personal computer, or a mobile device.

Typically, through the system, the customer can pay bills, or arrange other debits from his account. Bill payments may be done in a one-off fashion. Alternatively, the debit or bill payment may be set to happen automatically and periodically (e.g. on the same day of every month).

Another aspect of such systems is that they display to the user the transactions (whether debits or credits) that have taken place on the account. Credits may include, for example, direct deposit to the account of items such as payroll deposit, tax refunds, a P2P payment or any other credit. The transactions shown would also typically include payments made into the account that were initiated manually by the customer (e.g. going to the bank branch or ATM to deposit a cheque).

Debits to these account repositories typically include bills, whether paid manually at a bank branch, manually by online debit, or pre-authorized automatic monthly debit. Debits may also include events other than bill payments, such as automatic pre-authorized withdrawals deposited into a separate retirement savings account.

One concern of many account holders is cash flow. Even a customer who takes in enough money each month to cover his expenses may experience cash flow problems in his account if the debits and credits are not timed appropriately. An example would be a salaried worker who earns sixty thousand dollars per year after income tax and other deductions. His pay is delivered semi-monthly, on the first and fifteenth of each month, with each pay transaction consisting of a $2500 credit to his account.

With monthly expenses from the account of about $5000, and a monthly income to the account of $5000, the customer should be able to cover his expenses. However, if more than half of his expenses come out of the account between his first pay on the first of the month and his second pay on the fifteenth, there would be insufficient funds for at least some of his expenses. Such a state of affairs produces negative consequences not only for the customer, who fails to pay his bills on time; but for the bank, which is saddled with greater administrative cost and effort.

Of course, the example cited above is simple as compared with many real-world examples. Typically, salaries are paid weekly or bi-weekly, while bills are due monthly. Furthermore, the timing of some kinds of debits, like car lease payments or mortgage payments, are pre-determined at the time of funding which may not maintain their relevancy over an extended period of time.

In particular, the need exists for effective computer systems and computer methods that help customers improve cash flow and avoid negative balance situations.

Referring now to FIG. 1, the computing device 10 includes a computer 12. The computer 12 may comprise any processor driven computer, including, for example, a desktop personal computer, a laptop computer, a mainframe computer, a minicomputer, or a tablet. In one embodiment of computer 12 includes processor 14, an accounting database 16 and a memory 18. It will be appreciated that the configuration of computer 12 may be any suitable configuration. So, for example, the processor 14, account database 16 and memory 18 may or may not be co-located. Each of these components may itself comprise a single physical unit, or multiple physical units operatively connected to one another as required. Some of these components may also be combined as appropriate. For example, account database 16 may be contained within memory 18.

In one embodiment, computer 12 is operatively connected to network 20. In a typical scenario, described below, network 20 comprises the Internet. However, it will be appreciated that other types of networks are comprehended by the invention. What is important is that the network 20 functions to operatively connect computer 12, including processor 14, with a user display as described below. It will further be appreciated that a user display may be directly connected to computer 12, without use of a network 20, and still be comprehended by the invention.

In one example network 20 is operatively connected to user computer 22, which includes display 21 and user input device 23. In some embodiments, user computer 22 may be a desktop computer, laptop computer, tablet or other computing and/or mobile device. Typically, the user computer 22 may include an Internet browser to facilitate online communication between a user and the computer 12. Input device 23 may be a mouse or similar device.

Processor 14 is operatively connected to memory 18, which memory 18 stores computer readable instructions. Processor 14 is capable of executing the computer readable instructions to cause the computing device to execute the actions and methods described herein. As described further below, the actions and method steps include the determination of proposing timing for account events, which in one embodiment are carried out using recommendation engine 19.

In one embodiment, the account database 16 stores information about accounts. In a typical scenario, the computing device of the present invention can be used by bank account holders to manage their bank accounts, as discussed further below. It will be appreciated, however, that the invention comprehends other types of accounts, and not just bank accounts. Similarly, although the invention is being described in detail with respect to account events such as bill payments and pay cheques, the invention comprehends any and all account events.

Thus, the account database 16 stores data relating to the accounts, including, inter alia, the account event data associated with each account. This would typically include both the time of the events, the nature of the event (e.g. bill payment, automatic withdrawal, automatic deposit), and the amount (i.e. how much the account balance changed as a result of the event). Thus, the account database would store, for example, data as to past credit events (events that increase the balance, such as deposits of pay cheques), and debit events (events that decrease the balance, such as bill payments). In one embodiment the database 16 also stores data on insufficient funds events, namely, when an attempted debit cannot be completed because of an insufficient balance, and overdraft events, namely, when a debit exceeds the balance and the account goes into overdraft, but the debit is completed because the account has overdraft protection and is permitted to have a negative balance.

In one embodiment, the account database 16 also stores account settings, including records of account events, such as bill payments, that are scheduled to be executed automatically. For example, a user may have particular bills, such as an internet service bill or fitness-club bill, due monthly, and may have configured his account to automate the payment of this bill at the same time each month. In this example, the account database stores all of the information, such as the amount and day of the month for the bill payment.

The processor 14 can thus receive from database 16 data relating to the account, including past events and automatic payments, and use such data to assist the user in managing his account, as described below.

Figure 2:
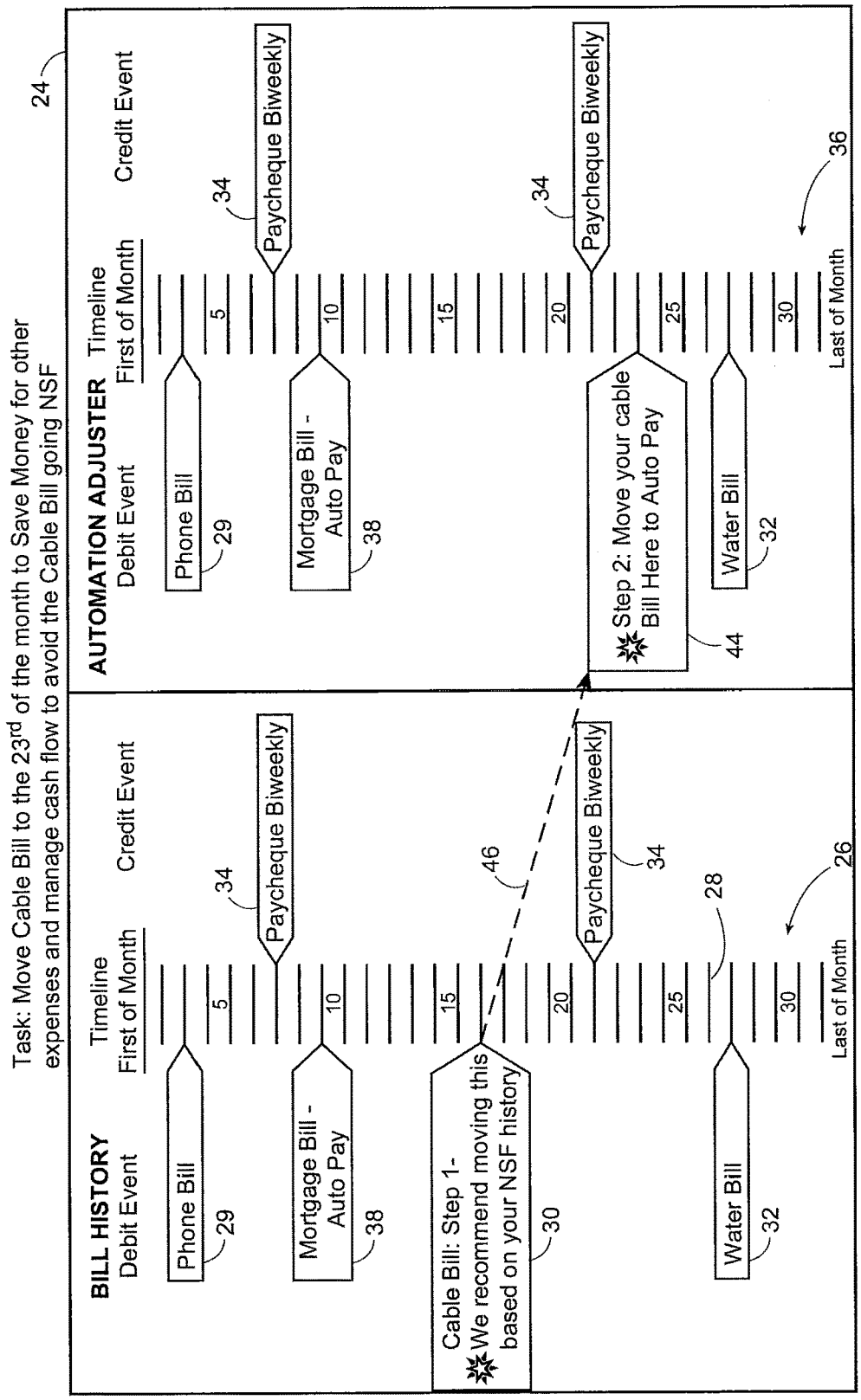
FIG. 2 is an illustrative user interface screen showing events along two timelines and a movable timing change object.

Referring now to FIG. 2, a user interface 24, being displayed by processor 14 on display 21, is shown. Within the user interface 24, based on the data received from database 16, the processor 14 displays an account event timeline image 26 for showing the timing of at least one of the account events reflected in the data received from the database. In one embodiment, the account event timeline image 26 represents a month, for example, a calendar month. Thus, account event timeline image 26 is marked at its top end, representing the beginning of the month, with the phrase "First of Month." It is marked at its bottom end, representing the end of the month, with the phrase "Last of Month."

The account event timeline image 26 shown in FIG. 2 is a pictorial timeline image, that is, it is a picture that takes the shape of a line. Thus, it is generally linear in configuration, and includes day markings, in the form of line segments 28, arranged substantially linearly. The account event timeline image, together with the account images along it, are a temporal arrangement of the account data. It will be appreciated that such a form provides the user with an effective visual impression of the position of objects along the timeline, as will be discussed further below.

Optionally, the account event timeline image 26 may also include a plurality of numbers along the timeline, arranged substantially linearly, each indicating a day of the month. For example, each day of the month may be marked by a number (e.g. 1-30 or 1-31). Alternatively, only some days of the month may be marked by numbers, while the remainder are not (e.g. only the $5^{th}$, $10^{th}$, $15^{th}$, $20^{th}$ and $25^{th}$ of the month are marked by numbers).

Also, based on the data received from database 16, the processor 14 displays along the account event timeline image 26 account event images, each representing an account event. Each account event image is positioned along the account event image to show the timing of each account event. In the embodiment shown in FIG. 2, the account events are divided into debit events (displayed on one side of the image 26) and credit events (displayed on the opposite side). The example debit event images include a phone bill modal 29, shown at the $3^{rd}$ of the month, mortgage bill modal 38, shown at the $8^{th}$ of the month, cable bill modal 30, shown at the $16^{th}$ of the month, and water bill modal 32, shown at the $27^{th}$ of the month. Example credit event images include two paycheque modals 34, shown as occurring at the $7^{th}$ and $21^{st}$ of the month.

Figure 3:
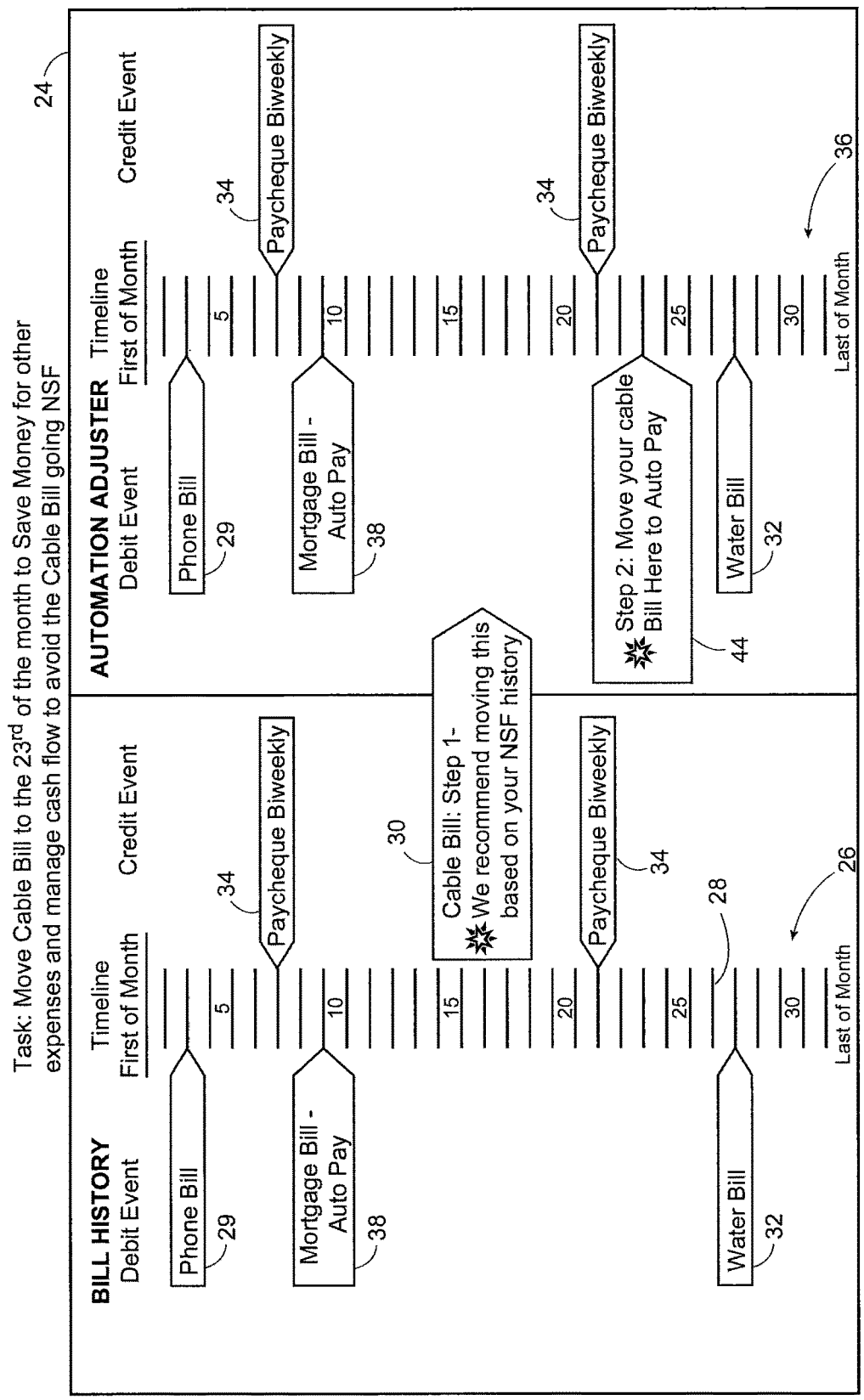
FIG. 3 is an illustrative user interface screen showing events along two timelines and the movable timing change object being moved.

The processor 14 is also causing to be displayed, based on the data received from database 16, an event placement timeline image 36, which in FIG. 3 is labelled "Automation Adjuster." In one embodiment, timeline image 36 is used, as discussed below, for scheduling account events, such as an automated bill payment or other automated debit event.

In one embodiment the event placement timeline image 36 has the same shape, day marking and numbering configuration as described above with respect to the account event timeline image 26. In addition, the timeline images 26 and 36 may be displayed in the side-by-side configuration shown in FIG. 2. This allows a user to easily compare account events associated with the account, and their timing each month, with future events (which may in different embodiments be scheduled or unscheduled) associated with the account, and their timing within each month. It also allows the user to easily and effectively execute and visualize the process of scheduling an account event, as described below. FIG. 2 shows a side-by-side configuration with the timeline images oriented vertically, but a side-by-side configuration is possible with a different orientation.

In one embodiment, the processor 14, based on the data received from the database 16, displays one or more future event images along the event placement timeline image 36, where each future event image corresponds to a future event. In FIG. 2, the example future debit event images are a phone bill modal 29, a mortgage bill modal 38, and a water bill modal 32.

In one embodiment, based on the received data, at least one scheduled event image, each corresponding to a scheduled account event, is displayed along the timeline image 36. In this example, one scheduled debit event (mortgage bill) is a automated bill payment scheduled at the same time each month. Thus, its timing is stored in database 16. Thus, the data received from database 16 permits processor 14 to display the debit event images 38 at the correct point along the event placement timeline image 36. As with the timeline image 26, in one embodiment timeline image 36 together with the events shown along it are a temporal arrangement of at least some of the account data, and proposed changed to that data as described below.

Furthermore, in one embodiment, the processor 14 is able to display events along timeline image 36 even when they are not automatic (e.g. phone bill and water bill in FIG. 2). The data from database 16 allows processor 14 and recommendation engine 19 to predict from past events when future events will occur.

The event images shown in FIG. 2 along timeline 36 also include two paycheque modals 34 shown as occurring at the $7^{th}$ and $21^{st}$ of the month. In this example, the data received from the database 16 includes past biweekly paycheque deposits that permit the processor 14 to display predicted future biweekly paycheque deposits, represented by modals 34.

The processor 14, for example, using recommendation engine 19, identifies one of the account events for scheduling, and determines a proposed timing at which the account event is to be scheduled (i.e at which the account event is to take place). In the example shown in FIG. 2, the identified event is the cable bill payment, which is also represented by modal 30 positioned on the account event image 26. Thus, the proposed timing can relate to an event that has occurred in the account in the past, but for which there is proposed a new timing to schedule the event, as in this example. Or, the proposed timing can relate to an event that has never occurred in the account, but for which a timing is proposed for scheduling.

In one embodiment, the processor 14 determines the proposed timing to avoid an insufficient funds event in the account. Thus, in the present example, the proposed timing for the cable bill payment is suggested because the processor 14 determines that moving the cable bill payment to a time after the second paycheque by scheduling it to be automatically executed at that time will reduce the risk of an insufficient funds event. In an insufficient funds event, there are insufficient funds to pay the bill, and the bill payment is not completed successfully.

It will be appreciated that there are other possible grounds for determining the proposed timing. These could include, for example, avoidance of an overdraft event, which could occur when there is overdraft protection associated with the account. Thus, the bill payment would successfully occur, but the account would be left in a negative balance situation. The proposed timing might also be based on avoidance, or reduction, of account fees. For example, some bank accounts incur fees if the balance falls below a certain threshold. Thus, the processor 14 can propose timing in order to change the cash flow profile of the account, so that the account balance does not fall below the threshold. Other grounds for determining proposed future timing may also be used.

Figure 4:
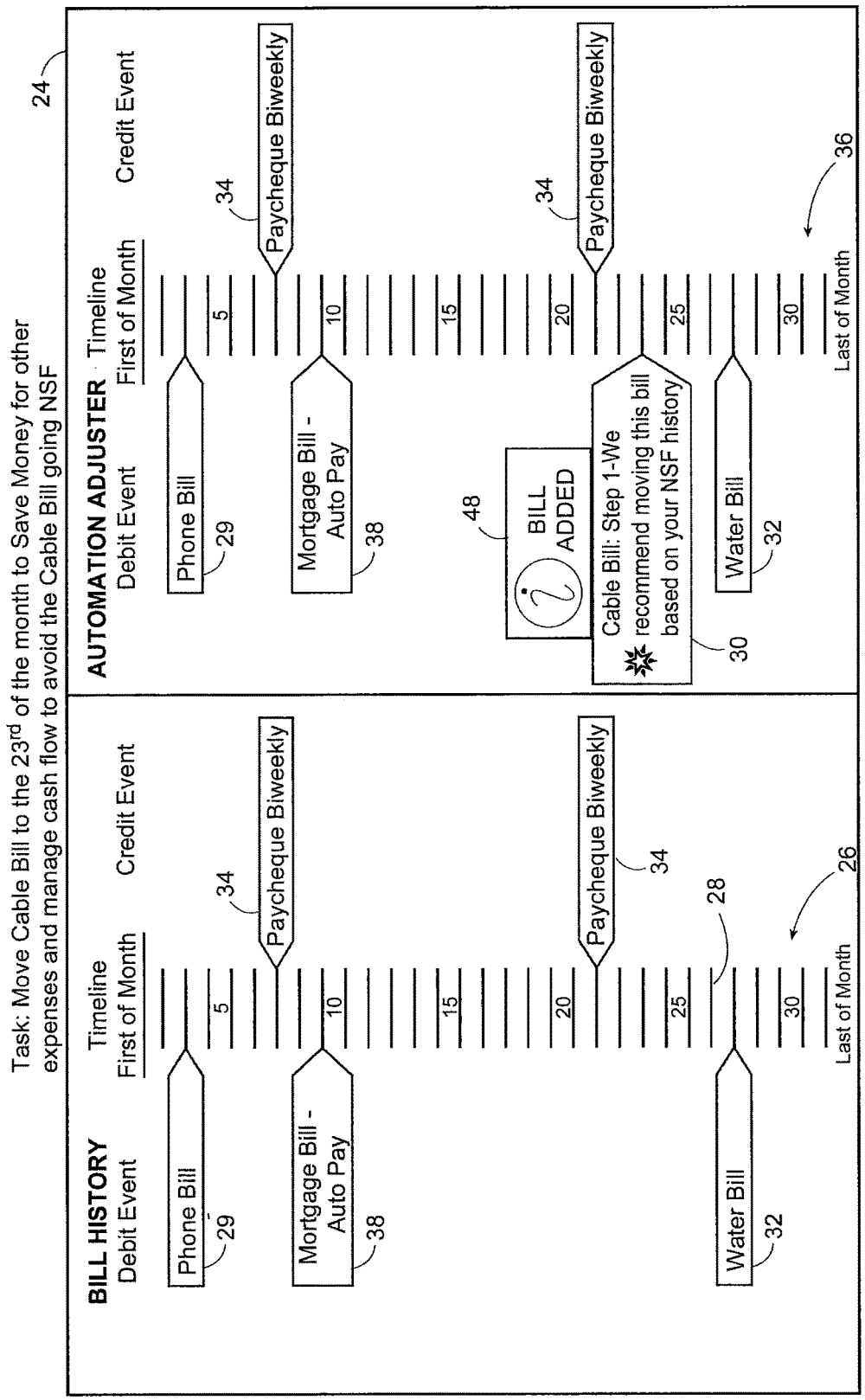
FIG. 4 is an illustrative user interface screen showing events along two timelines and the completed movement of the timing change.

In the example shown in FIGS. 2-4, the proposed timing for the cable bill payment is the $23^{rd}$ of the month, as shown in FIG. 4. Specifically, it is proposed that the cable bill payment be scheduled to be automatically executed on the $23^{rd}$ of the each month. This timing would be a change from the past timing of the cable bill, which was the $16^{th}$ of the month. In addition, the cable bill payment would be scheduled for auto payment. In this example, the proposed timing is a single day of the month. It will be appreciated, however, that the invention comprehends that the proposed timing will be a range of more than one day. Alternatively, the invention comprehends the proposed timing being two or more non-contiguous days or day ranges.

Having determined the proposed timing, the processor 14 displays a corresponding proposed timing image 44 which is visually associated with a point on the event placement timeline image corresponding to the proposed timing. Processor 14 also displays a movable timing change object. In one embodiment, the timing change object is selectable, and the user is prompted to select it. When input is received from the user in relation to the movable time change object, the processor modifies account settings to schedule the identified account event (in this example, the cable bill payment) for automatic execution at the proposed timing.

In the example shown in FIGS. 2-4, the proposed timing is the 23$^{rd}$ of the month. The movable timing change object in this example is the modal 30, which is positioned adjacent to the account event image. Thus, in the present example, the modal 30 functions both as an account event image and as the movable timing change object, so that displaying modal 30 constitutes displaying both an account event image and the movable timing change object. However, it will be appreciated that the invention comprehends a movable timing change object separate from the past event images.

In the example shown in FIG. 2, the proposed timing image 44 is visually associated with a point on the event placement timeline image 36 corresponding to the proposed timing, by means of it being positioned at that point, and overlapping the event placement timeline image 36 at that point. It will be appreciated, however, that other types of visual association are comprehended by the invention. For example, a line could be displayed from image 44 to the point on the event placement timeline image 36. What is important is that the proposed timing object 44 be visually associated with the point corresponding to the proposed timing, so that the user can easily and effectively ascertain the portion of the month at which the bill payment is proposed to be scheduled.

In the embodiment of FIG. 2, modal 30 contains a message to the user suggesting movement of the cable bill payment to a different day of the month to avoid an insufficient funds event. Arrow 46 is displayed, which extends from modal 30 to proposed timing image 44. The arrow 46 encourages the user to move object 30 to where proposed timing image 44 is located. This movement is shown in FIG. 3.

Processor 14 modifies settings to schedule the identified event—in this example, the cable bill—for automatic execution at the proposed timing. The modification occurs once input is received in relation to the movable timing change object 30. In one embodiment, that input comprises the user selecting the movable object by dragging movable object 30 using a mouse or other similar input device, and dropping it at the proposed timing image, or otherwise at a position along the timeline image 36 representing the proposed timing. FIG. 3 shows the movement of object 30 taking place. Once this input is received, the account settings are modified, for example, in database 16, so that the identified account event (in this case cable bill 30) is henceforth automatically paid at the proposed future timing (in this case, the 23$^{rd}$ of the month).

It will be appreciated that the device 10 can provide for modes of input different from that described above. For example, a user may be able to simply click on the object 30 using a mouse. However, it will be appreciated that dragging and dropping the object 30 provides a particularly effective visual representation to the user of the change in bill payment timing.

FIG. 4 shows the cable bill image 30 after it has been moved to the event placement timeline image 36. In one embodiment, once the movement is completed, the processor 14 displays an event change notification image 48. The notification image 48 confirms to the user that the change in timing for the cable bill has been completed.

In another embodiment, a separate and distinct movable timing change object is not displayed. Rather, an account event image associated with the identified account event has its position changed. In response to an input to change the position of the account event image corresponding to the identified account event (e.g. dragging and dropping the account event image, or clicking on it), the identified account event is scheduled for automatic execution at the proposed timing. In the embodiment of FIGS. 2-4, the relevant account event image is image 30.

Figure 5:
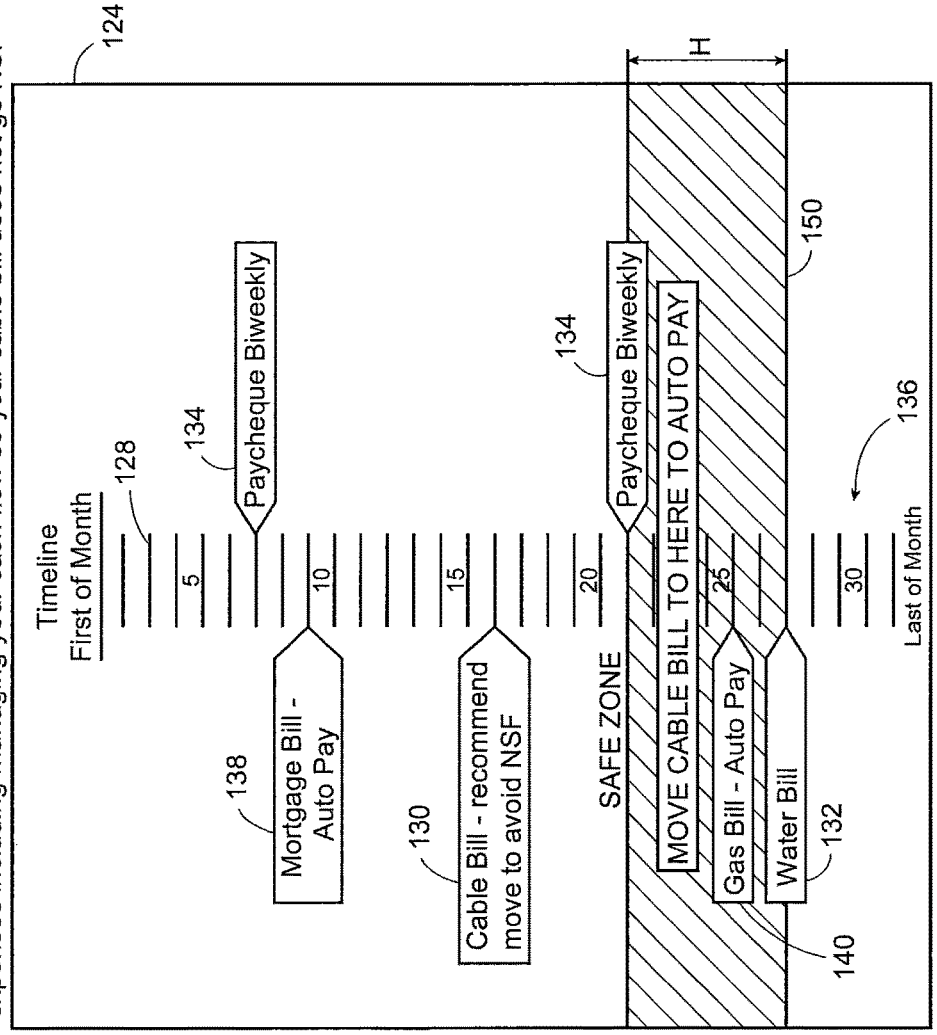
FIG. 5 is an illustrative user interface screen showing events along a timeline having a preferred event time range image, and a movable timing change object.

Another aspect of the invention is illustrated by the embodiment shown in FIGS. 5-8. Referring now to FIG. 5, a second user interface 124 is shown. Within UI 124, based on the data received from database 16, the processor 14 displays an event placement timeline image 136. Like the previously-described timeline images, the event placement timeline image 136 represents a time period, which is in one embodiment a month, for example, a calendar month. Timeline image at 136 may be marked at its top end, representing the beginning of the month, with the phrase "First of Month." It may be marked at its bottom end, representing the end of the month, with the phrase "Last of Month." The timeline image 136 represents a future or upcoming time period.

The timeline image 136 in one embodiment is a pictorial timeline image, that is, it generally takes the shape of a line. Thus, it is generally linear in shape, and includes day markings, in the form of line segments 128, arranged substantially linearly. It will be appreciated that such a form provides the user with an effective visual impression of the position of objects along the timeline.

Optionally, the timeline image 136 may also include numbering, such as the numbering described above in relation to the timeline images in FIG. 2.

Also based on the data received from database 16, the processor 14 displays along the timeline image 136 one or more event images, each event image corresponding to a future event. Typically, the future events comprise one or more debit events and one or more credit events. Each event image is positioned along the timeline image 136 for showing the timing of each future event along the timeline image 136. It will be appreciated that the processor 14 using recommendation engine 19, predicts the future events in the account based on data from past events stored in database 16. Thus, the data shows, for example, that the account holder received a paycheque deposit biweekly. It also shows that certain bills, such as the mortgage bill and gas bill, are automatically withdrawn at such times each month. Even bills that are not automatic, like the water bill, can have their future payments times predicted with reasonable confidence, in light of past data on the timing of their payment.

As with the timeline images described in FIG. 2, in the embodiment shown in FIG. 5, the debit events are shown on one side of the timeline image, and the credit events on the opposite side. In FIG. 5, the debit events are on the left, and the credit events are on the right.

In FIG. 5, the example future debit events include cable bill modal 130, water bill modal 132, mortgage bill modal 138, and gas bill modal 140. The example future credit events include two paycheque modals 134.

Using the data from database 16, the processor determines a preferred event time range, during which the risk of a predefined adverse outcome resulting from one of the future events is reduced. Thus, the preferred event time range is essentially a "safe zone", that is, a part of the month during which it is relatively safe to schedule a particular event, such as a bill payment.

The processor 14 then displays a preferred event time range indicator along the timeline image 138, the size of the indicator corresponding to the size of the preferred event time range. In the example of FIG. 5, the preferred event time range indicator comprises highlighted region 150. In one embodiment, highlighted region 150 functions to communicate to the user a time period during the month when it would be safe, based on the account data, to schedule a particular event.

In the example of FIG. 5, the processor 14 is suggesting that the cable bill payment be rescheduled, and uses highlighted region 150 to indicate to the user the time range into which the cable bill payment should be moved. It will be appreciated that, in the example of FIG. 5, the debit event which is being recommended for rescheduling is a bill that was previously paid out of the account. However, it will be appreciated that the invention is not limited to such a case. For example, the user may request that the system suggest a timing for a debit event that has never occurred in the account, but will in future.

It will be appreciated that in one embodiment the highlighted region 150 is sized, shaped and configured to be conspicuous. In the example of FIG. 5, it extends substantially across the width of the user interface, and it is bright green in colour. It is also positioned along and overlaid on timeline image 136, so that its height H indicates clearly to the user the size of the preferred event time range, or "safe zone."

In one embodiment of this aspect of the invention, the height H is proportional to the size of the "safe zone." Thus, when the size of the "safe zone" changes, as discussed below, the size of the highlighted region 150 will change proportionally. The highlighted region 150 thus provides the user with a visual feel for the size of the "safe zone." The user does not need to laboriously count the days on the timeline image. Rather, the user has a sense of the size of the "safe zone" simply from looking at it. If it is very thin (H is small), the user understands that only a small period during the month when he can safely schedule the debit event in question. If the region 150 is thick or high (i.e. H is larger), then the user understands that a larger part of the month is safe for the debit event in question.

The invention comprehends that the processor 14 can suggest more than one preferred event time range, and thus can display more than one preferred event time range indicator, at the same time. For example, consider a case in which a certain monthly debit needs to be scheduled. Based on the received data, the processor 14 may determine that the debit can safely be made in two or more separate time periods during the month (for example, between the $5^{th}$ and $10^{th}$, and between the $20^{th}$ and $25^{th}$). These time periods would collectively comprise the preferred event time range. The invention further comprehends displaying two or more separate corresponding highlighted regions 150 (or another type of time range indicator), which would collectively comprise the preferred event time range indicator.

It will be appreciated that the invention comprehends other forms of preferred event time range indicator besides highlighted region 150. What is important is that the indicator be positioned along the timeline to indicate the preferred time range for rescheduling the relevant future event.

The processor 14, for example using recommendation engine 19, identifies one of the future events for movement into the preferred event time range to reduce the likelihood of a predefined adverse outcome. In the example of FIG. 5, that future event is the cable bill. At the top of the UI 124, and in a modal positioned within highlighted region 150, there is displayed a message suggesting that the cable bill be moved into the "safe zone" represented by the highlighted region 150.

It will be appreciated that there are various possible predefined adverse outcomes. They could include any one of an insufficient funds event, an overdraft event, or an excess account fees event. Or, the adverse outcome could be two or three of these events simultaneously. Thus, for example, an adverse outcome could be predefined as an outcome that is either an insufficient funds event or an overdraft event. Or, it could be predefined as any outcome that is either an insufficient funds event, an overdraft event, or an excess account fees event. Other predefined adverse outcomes are also comprehended by the invention.

The processor 14 displays a movable object. When input is received in relation to the movable object, settings associated with the account are modified by processor 14 to automatically execute the identified future event at a time within the preferred event time range.

In the example of FIG. 5, the movable object is cable bill modal 130. Cable bill modal 130, in this example, functions as both the movable object and one of the event images. However, the invention comprehends a movable object separate from the event images.

Figure 6:
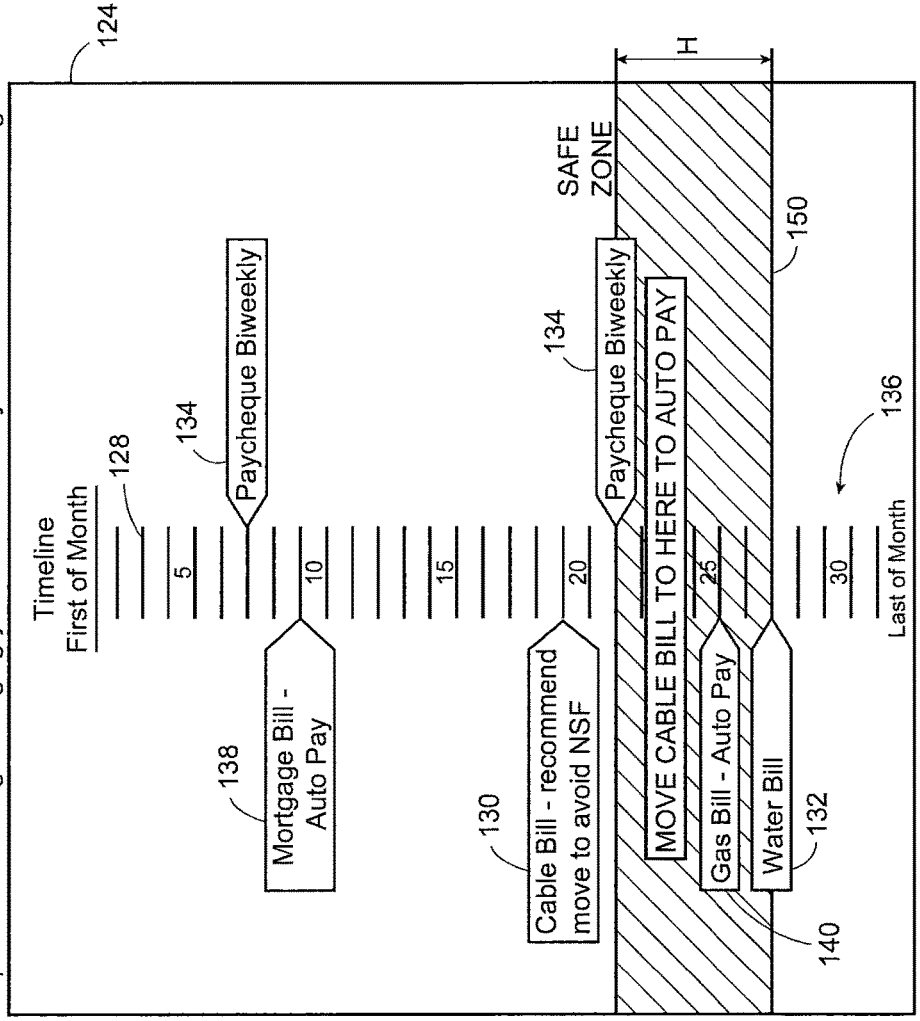
FIG. 6 is an illustrative user interface screen showing events along a timeline having a preferred event time range image, and the movable timing change object being moved.

In one embodiment, the input consists of the object 130 being dragged and dropped into the highlighted region 150, for example using a mouse or similar device. FIG. 6 shows the modal 130 being dragged and dropped into the highlighted region 150. However, other types of input are comprehended by the invention including, for example, clicking on the object.

Figure 7:
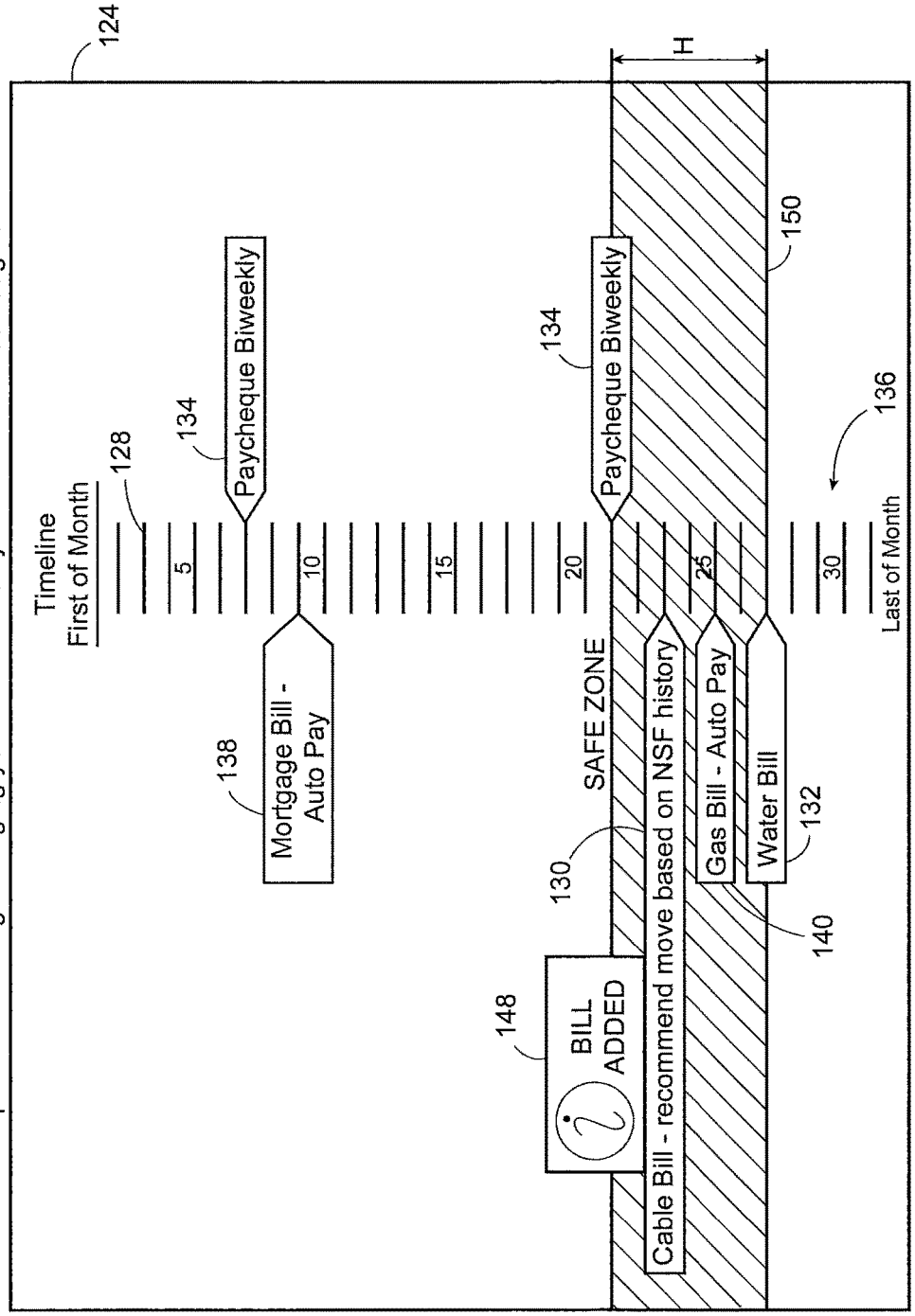
FIG. 7 is an illustrative user interface screen showing events along a timeline having a preferred event time range image, and a completed movement of the movable timing change object.

FIG. 7 shows the object 130 displayed within highlighted region 150 after being moved there. As shown in FIG. 7, once the object 30 is dragged and dropped into the highlighted region 150, a notification image 148 is displayed to confirm to the user that the timing of the identified future event has been changed.

It will be appreciated that, once the identified future event has been rescheduled into the safe zone, the cash flow profile of the account will likely change, with the result that the size of the safe zone, and thus of the highlighted region, would change. In one embodiment, in response to the identified future event being rescheduled, the processor 14 adjusts the size of the preferred event time range and the preferred event time range indicator 150.

Figure 8:
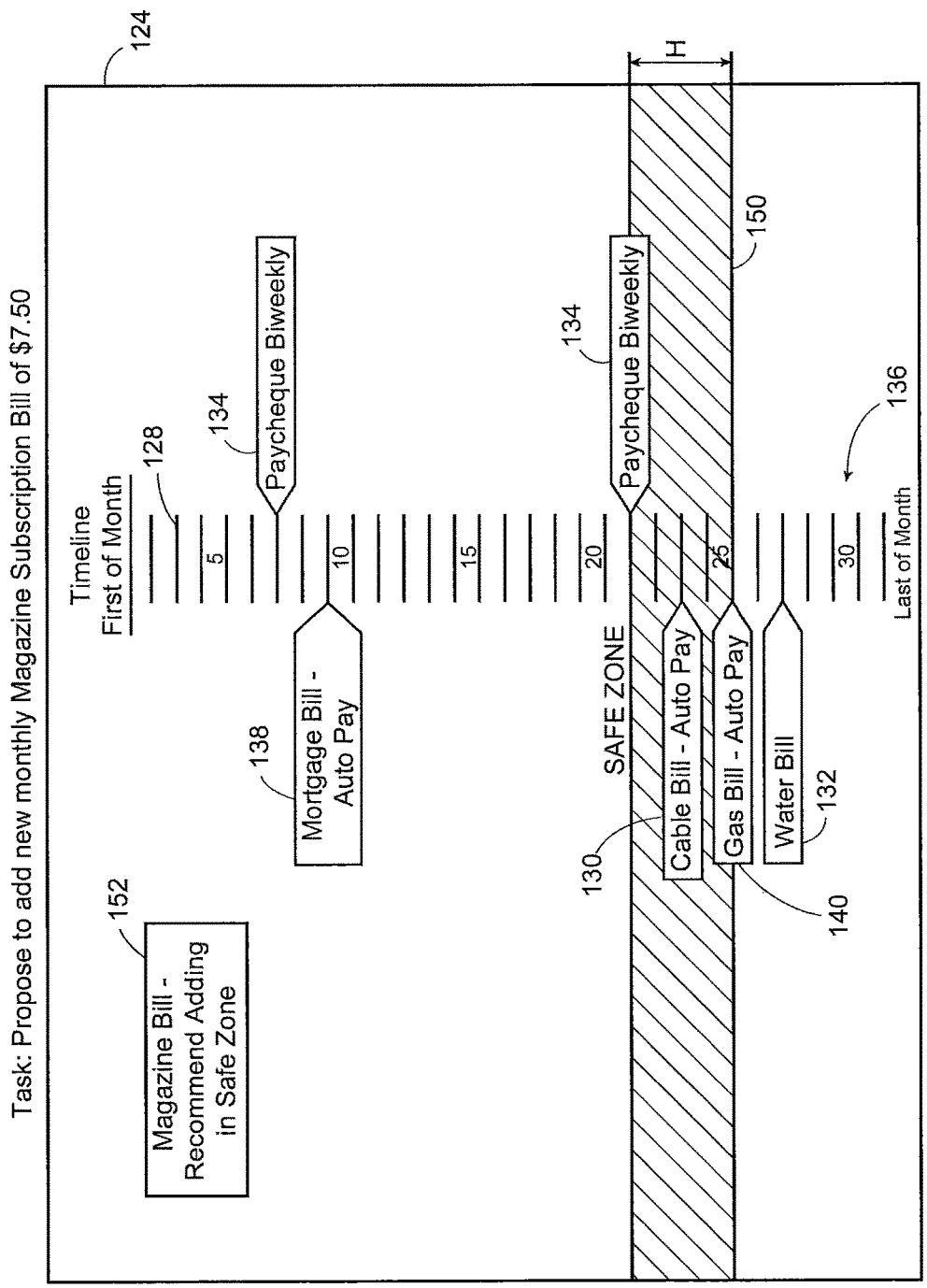
FIG. 8 is an illustrative user interface screen, showing events along a timeline having a preferred event time range image, with the size of the preferred event time range having been adjusted.

This adjustment is shown in FIG. 8. In the example of FIG. 8, the moving of the cable bill is complete, and it is proposed to add a new bill payment, namely, a magazine bill for $7.50 per month, represented by movable object 152. The size of the preferred event time range indicator, H, has been adjusted to a smaller size as a result of the addition of the cable bill. The preferred event time range now consists of a smaller number of days.

It will be appreciated that features from the two aspects of the invention may be combined in appropriate circumstances. As an example, it may be beneficial to make use of the highlighted region 150 in the first aspect of the invention, particularly when the proposed future timing comprises a range of time longer than a day. Other features of the two aspects of the invention may be combined when possible and desirable to do so.

Embodiments of both aspects of the invention effectively impart information to the user by means of the use of pictures. Account events are shown positioned along a timeline, which gives a user a faster, better, more intuitive feel for the account events and their timing than a text or number-based description would. In the first aspect of the invention, the use of pictures, namely, two timelines, allows the user to have a better and more intuitive feel for how the situation will change in the account once the event is rescheduled. Similarly, in the second aspect of the invention, the preferred event time range indicator communicates visually the size of the "safe zone", because its size along the timeline image corresponds to the size of the "safe zone."

Furthermore, the moving of movable objects to reschedule account events makes the present system and method more intuitive and visual for the user than, for example, a system where event timing is changed by typing letters or numbers. In the present system, the user feels like he is actually seeing the change in event timing. In addition, it is believed that embodiments of the present invention, and in particular the movable objects, provide a high level of perceived affordance to the user—that is, the user intuitively understands that dragging and dropping the object is a meaningful and useful act.

While illustrative embodiments of the invention have been described in detail above, it will be appreciated that various changes and modifications may be made to these embodiments that are comprehended by the invention.

The invention claimed is:

1. A computer-implemented method, comprising:
   receiving, by at least one processor, account event data identifying one or more account events that occurred during a prior temporal interval;
   by the at least one processor, and based on the account event data, generating and presenting, on a display, (i) an account event timeline image and an account event image within a first portion of a digital interface, and (ii) an event placement timeline image within a second portion of the digital interface, the account event image being associated with one of the account events and being disposed at a corresponding position along the account event timeline image, the corresponding position being indicative of a timing of the associated account event during the prior temporal interval;
   determining, by the at least one processor, a proposed timing for the associated account event during a future temporal interval;
   by the at least one processor, generating and presenting, on the display, a proposed timing image within the second portion of the digital interface, the proposed timing image being disposed at a position along the event placement timeline image that is visually associated with the proposed timing; and
   by the at least one processor, receiving input data indicative of a selection of the proposed timing image and based on the input data, performing operations that schedule the associated account event for automatic execution in accordance with the proposed timing.

2. The computer-implemented method of claim 1, wherein:
   the account event data further identifies one or more scheduled account events expected to occur during the future temporal interval; and
   the method further comprises, based on the account event data, generating and presenting, on the display, at least one scheduled event image positioned along the event placement timeline image, each of the at least one scheduled event image being associated with a corresponding one of the scheduled account events.

3. The computer-implemented method of claim 1, wherein the one or more account events comprise at least one of a debit event or a credit event, and wherein the associated account event comprises a debit event.

4. The computer-implemented method of claim 1, wherein the event placement timeline image comprises a series of day-markings arranged within the second portion of the digital interface along a longitudinal axis of the event placement timeline image.

5. The computer-implemented method of claim 1, wherein the first and second portions of the digital interface are positioned side-by-side.

6. The computer-implemented method of claim 1, wherein the proposed timing avoids an insufficient funds event in an account.

7. The computer-implemented method of claim 1, wherein the proposed timing comprises a time range of more than one day.

8. The computer-implemented method of claim 1, wherein:
   the input data comprises a user input provided to an input device associated with a communications device; and
   the user input comprises a selection of the account event image at the corresponding position along the account event timeline image and a movement of the account event image to the position along the event placement timeline image.

9. A computing device comprising:
   a memory for storing computer readable instructions; a display; and
   a processor operatively connected to the memory, and the display, the processor being configured to execute the computer readable instructions to:
   receive account event data identifying one or more account events that occurred during a prior temporal interval;
   based on the account event received data, generate and present, on the display, (i) an account event timeline image and an account event image within a first portion of a digital interface, and (ii) an event placement timeline image within a second portion of the digital interface, the account event image being associated with one of the account events and being disposed at a corresponding position along the account event timeline image, the corresponding position being indicative of a timing of the associated account event during the prior temporal interval;
   determine a proposed timing for the associated account event during a future temporal interval;
   generate and present, on the display, a proposed timing image within the second portion of the digital interface, the proposed timing image being disposed at a position along the event placement timeline image that is visually associated with the proposed timing; and
   receive input data indicative of a selection of the proposed timing image and based on the input data, perform operations that schedule the associated account event for automatic execution in accordance with the proposed timing.

10. The computing device of claim 9, wherein:
    the account event data further identifies one or more scheduled account events expected to occur during the future temporal interval; and
    the processor is further configured to execute the computer readable instructions to, based on the account event data, generate and present, on the display, at least one scheduled event image positioned along the event placement timeline image, each of the at least one scheduled event image being associated with a corresponding one of the scheduled account events.

11. The computing device of claim 9, wherein the one or more account events comprise at least one of a debit event or a credit event, and wherein the associated account event comprises a debit event.

12. The computing device of claim 9, wherein the event placement timeline image represents a month.

13. The computing device of claim 12, wherein the event placement timeline image comprises a series of day-markings arranged within the second portion of the digital interface along a longitudinal axis of the event placement timeline image.

14. The computing device of claim 9, wherein the first and second portions of the digital interface are positioned side-by-side.

15. The computing device of claim 9, wherein the proposed timing avoids an insufficient funds event in an account.

16. The computing device of claim 9, wherein the proposed timing comprises a time range of more than one day.

17. The computing device of claim 9, wherein:
the computing device further comprises an input device coupled to the processor; and
the processor is further configured to execute the computer readable instructions to receive the input data from the input device, the input data characterizing a user input provided to the input device, and the user input comprising a selection of the account event image at the corresponding position along the account event timeline image and a movement of the account event image to the position along the event placement timeline image.

18. The computing device of claim 9, further comprising an input device coupled to the processor, wherein the processor is further configured to execute the computer readable instructions to receive the input data from the input device.

19. The computing device of claim 9, wherein the processor is further configured to execute the computer readable instructions to:

load at least a portion of the account event data from the memory;
generate an additional portion of the account event data that reflects the automatic execution of the associated account event in accordance with the proposed timing; and
store the additional portion of the account event data within the memory.

20. A tangible, non-transitory computer-readable medium storing instructions that, when executed by at least one processor, cause the at least one processor to perform a method, comprising:
receiving account event data identifying one or more account events that occurred during a prior temporal interval;
based on the account event data, generating and presenting, on a display, (i) an account event timeline image and an account event image within a first portion of a digital interface, and (ii) an event placement timeline image within a second portion of the digital interface, the account event image being associated with one of the account events and being disposed at a corresponding position along the account event timeline image, the corresponding position being indicative of a timing of the associated account event during the prior temporal interval;
determining a proposed timing for the associated account event during a future temporal interval;
generating and presenting, on the display, a proposed timing image within the second portion of the digital interface, the proposed timing image being disposed at a position along the event placement timeline image that is visually associated with the proposed timing; and
receiving input data indicative of a selection of the proposed timing image and based on the input data, performing operations that schedule the associated account event for automatic execution in accordance with the proposed timing.

* * * * *